United States Patent
Zhao et al.

(10) Patent No.: US 11,585,212 B2
(45) Date of Patent: Feb. 21, 2023

(54) ANISOTROPY MODEL GUIDED FRACTURE PROPERTIES EXTRACTION FROM VSP DATA

(71) Applicant: Halliburton Energy Services, Inc., Houston, TX (US)

(72) Inventors: Xiaomin Zhao, Sugar Land, TX (US); Mark Elliott Willis, Katie, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 299 days.

(21) Appl. No.: 16/984,018

(22) Filed: Aug. 3, 2020

(65) Prior Publication Data
US 2021/0062645 A1 Mar. 4, 2021

Related U.S. Application Data

(60) Provisional application No. 62/895,293, filed on Sep. 3, 2019.

(51) Int. Cl.
*E21B 47/135* (2012.01)
*G01V 8/24* (2006.01)
(Continued)

(52) U.S. Cl.
CPC .............. *E21B 49/00* (2013.01); *E21B 43/26* (2013.01); *G01V 1/226* (2013.01); *G01V 1/301* (2013.01);
(Continued)

(58) Field of Classification Search
CPC .... E21B 47/0224; E21B 47/135; E21B 43/26; G01V 2210/66; G01V 2210/626;
(Continued)

(56) References Cited

U.S. PATENT DOCUMENTS 9,347,313 B2 * 5/2016 Wills ...................... E21B 43/26
10,175,374 B2 * 1/2019 Dusterhoft ............... G01V 1/42
(Continued)

OTHER PUBLICATIONS

Bakulin, et al., "Estimation of fracture parameters from reflection seismic data—Part 1: HTI model due to a single fracture set", Geophysics, vol. 65, No. 6, retrieved on Aug. 22, 2019 from https://inside.mines.edu/~itsvanki/Papers_pdf/pap00_8.pdf, Nov.-Dec. 2000 2000, pp. 1788-1802.
(Continued)

*Primary Examiner* — Kenneth L Thompson
(74) *Attorney, Agent, or Firm* — Delizio, Peacock, Lewin & Guerra

(57) ABSTRACT

A DAS VSP technique is used to determine the induced fracture height and fracture density of an induced fracture region. The DAS VSP technique obtains pre-hydraulic fracturing DAS VSP survey time-lapse data to establish a baseline reference for the direct acoustic wave travel time. The DAS VSP technique obtains one or more time-lapse data corresponding to the subsequent monitor surveys conducted after each hydraulic fracturing stage along the well. Forward modeling is used to determine a theoretical acoustic wave travel time difference. The forward modeling uses seismic anisotropy to describe the behavior of seismic waves traveling through the induced fracture regions. An inversion scheme is then used to invert for the induced fracture height and the fracture density using the forward modeling. The two extracted induced fracture characteristics may then be used to determine optimal hydraulic fracturing parameters.

20 Claims, 6 Drawing Sheets

(51) Int. Cl.
*E21B 49/00* (2006.01)
*G01V 1/22* (2006.01)
*G01V 1/30* (2006.01)
*G01V 99/00* (2009.01)
*E21B 43/26* (2006.01)
*G01V 1/52* (2006.01)

(52) U.S. Cl.
CPC .............. *G01V 1/305* (2013.01); *G01V 1/306* (2013.01); *G01V 1/52* (2013.01); *G01V 99/005* (2013.01); *E21B 2200/20* (2020.05); *G01V 2210/626* (2013.01); *G01V 2210/66* (2013.01)

(58) Field of Classification Search
CPC . G01V 8/14; G01V 8/24; G01V 1/226; G01V 1/305; G01V 1/306
See application file for complete search history.

(56) References Cited

U.S. PATENT DOCUMENTS

| | | | | |
|---|---|---|---|---|
| 10,739,494 | B2* | 8/2020 | Thompson | G01V 1/306 |
| 10,808,521 | B2* | 10/2020 | Friehauf | E21B 47/07 |
| 10,920,538 | B2* | 2/2021 | Rodriguez Herrera | E21B 43/267 |
| 10,983,233 | B2* | 4/2021 | Maucec | G01V 1/302 |
| 11,187,071 | B2* | 11/2021 | Luo | E21B 47/003 |
| 2011/0141846 | A1 | 6/2011 | Uhl et al. | |
| 2017/0342814 | A1 | 11/2017 | Krueger et al. | |
| 2018/0223648 | A1 | 8/2018 | Wilson et al. | |
| 2019/0120047 | A1 | 4/2019 | Jin et al. | |

OTHER PUBLICATIONS

Binder, et al., "Time-lapse Seismic Monitoring of Individual Hydraulic Frac Stages Using a Downhole Distributed Acoustic Sensing Array", Unconventional Resources Technology Conference (URTeC):409, Denver, Colorado, Jul. 22-24, 2019, 12 pages.
Byerley, et al., "Time lapse seismic monitoring of individual hydraulic frac stages using a downhole DAS array; Part 1—Field experiment and observations", SEG International Exposition and 88th Annual Meeting, 2018, pp. 5293-5297.
Byerley, et al., "Time-Lapse seismic monitoring of individual hydraulic frac stages using a downhole DAS array", The Leading Edge, Nov. 2018, pp. 802-810.
Meek, et al., "Time_Lapse Imaging of a Hydraulic Stimulation Using 4-D Vertical Seismic Profiles and Fiber Optics in the Midland Basin (Part B)", Proceedings of the 5th Unconventional Resources Technology Conference, URTeC:2695394, 2017, 8 pages.
Thomsen, "Weak elastic anisotropy", Geophysics, vol. 51, No. 10, retrieved on Aug. 22, 2019 from http://www.deltageophysics.net/biblio/Thomsen_86.pdf, Oct. 1986, pp. 1954-1966.
Tsvankin, "Reflection moveout and parameter estimation for horizontal transverse isotropy", Geophysics vol. 62, No. 2, retrieved on Aug. 22, 2019 from https://inside.mines.edu/~itsvanki/Papers_pdf/pap97_1.pdf, Mar.- Apr. 1997, pp. 614-629.
Willis, "Estimating frac fluid pathways from rapid time-lapse VSP and microseismic events", SEG Denver Annual Meeting, 2014, pp. 4577-4581.
PCT Application Serial No. PCT/US2020/044836, International Search Report, dated Nov. 3, 2020, 4 pages.
PCT Application Serial No. PCT/US2020/044836, International Written Opinion, dated Nov. 3, 2020, 6 pages.
Lellouch, et al., "Velocity analysis and moveout-based event detection using downhole DAS records", Society of Exploration Geophysicists, SEG International Exposition and 89th Annual Meeting, Aug. 10, 2019, pp. 989-993.

* cited by examiner

ANISOTROPY MODEL GUIDED FRACTURE PROPERTIES EXTRACTION FROM VSP DATA

This disclosure generally relates to determining chemical or physical properties (G01N) and to analyzing by the use of ultrasonic, sonic, or infrasonic waves (G01N 29/00).

Hydraulic fracturing is a well stimulation operation that pumps engineered fluids at high pressure and rate into an interval of a subterranean formation to be treated. The fluids pumped in the hydraulic fracturing builds pressures downhole and causes fractures to open in the formation thereby releasing hydrocarbons.

To assess activities down hole in the fracturing operations, various measurements and sensed data are used. In one technique, a fiber optic cable is used in the subterranean formation for vertical seismic profile (VSP) acquisition. A VSP refers to the measurement of seismic/acoustic energy in a wellbore originating from a seismic source at the surface of the wellbore (e.g., a vibrator truck, air gun, and/or explosives). Distributed acoustic sensing (DAS) may be used to acquire the seismic data to form the VSP. Acoustic sensing based on DAS uses the Rayleigh backscatter property of a fiber's optical core to spatially detect disturbances that are distributed along a length of fiber positioned within a wellbore. This data is measured over time to generate time-lapse data.

BRIEF DESCRIPTION OF THE DRAWINGS

Aspects of the disclosure may be better understood by referencing the accompanying drawings.

DESCRIPTION

Figure 1:
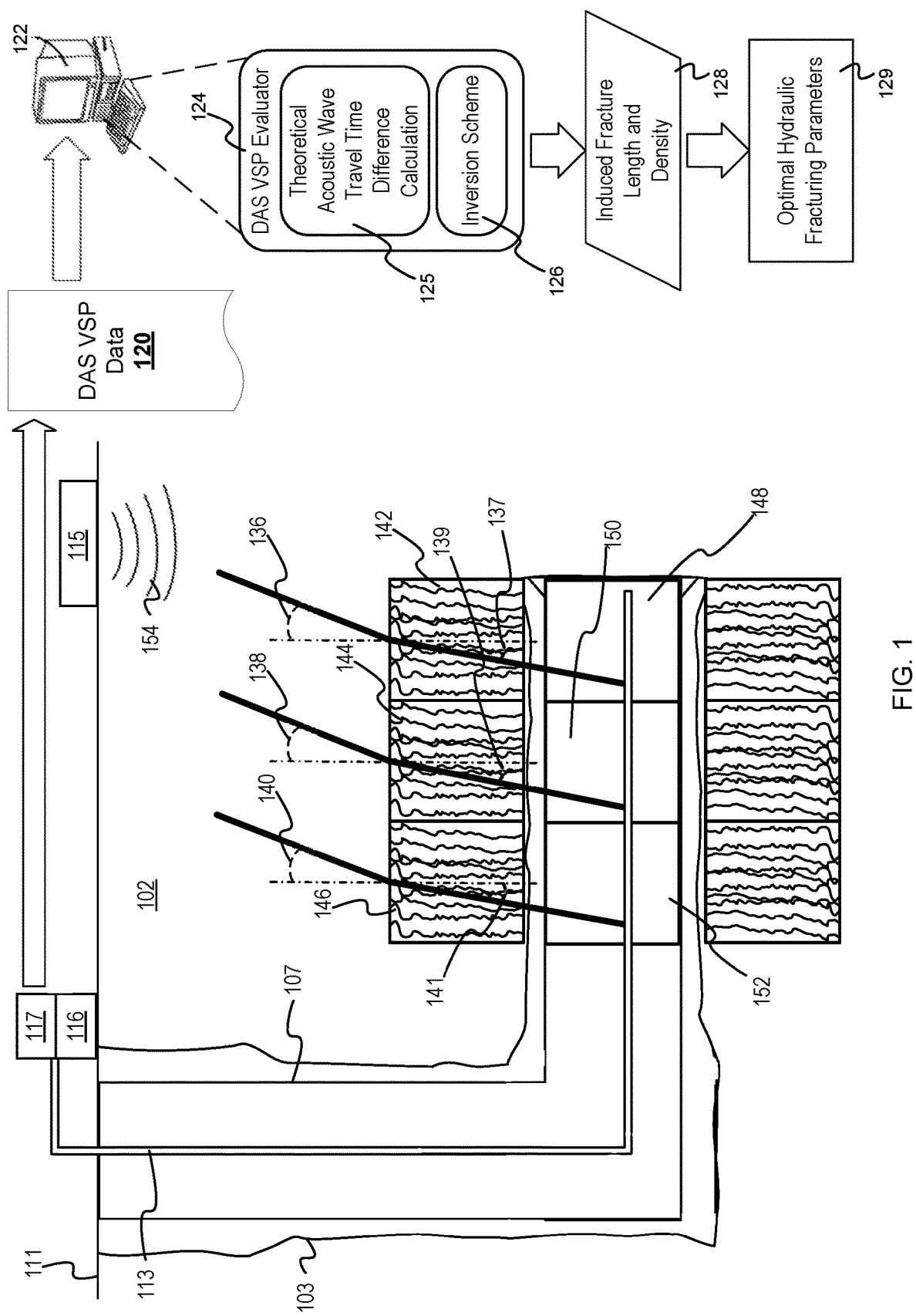
FIG. 1 depicts an example DAS VSP system for determining induced fracture height and fracture density.

The description that follows includes example systems, methods, techniques, and program flows that embody aspects of the disclosure. However, it is understood that this disclosure may be practiced without these specific details. For instance, this disclosure refers to plug-and-perf multi-zone fracturing in illustrative examples. Aspects of this disclosure can be also applied to various types of fracturing techniques, such as ball and sleeve technique and pinpoint fracturing. In other instances, well-known instruction instances, protocols, structures and techniques have not been shown in detail in order not to obfuscate the description.

Overview

The amount of hydrocarbons released from hydraulic fracturing depends on various parameters of the fracturing operation, such as treatment volume, injection rate, and fracture fluid viscosity. A change in a fracturing operation parameter often results in a change in the induced fracture properties of the subterranean region affected. This change in the induced fracture properties in turn affects the amount of hydrocarbons produced by a well. A technique that assesses the induced fracture properties allows determination of the hydraulic fracturing parameters that contributes to a successful well having high production flow rates and allows subsequent correlation of successful fracture properties with hydraulic fracturing parameters.

A DAS VSP technique has been developed to determine induced fracture height and fracture density along a well. The DAS VSP technique determines the induced fracture height and fracture density based on the anisotropic nature of the induced fracture regions. Seismic waves entering the region with vertical fractures often exhibit seismic anisotropy characteristics. Seismic anisotropy is the dependence of seismic propagation velocity on direction or upon angle. Hydraulic fracturing in a horizontal well generates vertical induced fractures in the rock around the treated region filled with hydraulic fracturing fluid, wherein the fracturing fluid decreases the velocity of the acoustic wave entering in and delays its arrival at the well. Rocks with vertically aligned fractures are classified and modeled as an HTI (Horizontal Transversely Isotropic) medium with a horizontal TI (transverse isotropy) symmetry axis.

The DAS VSP technique first obtains pre-hydraulic fracturing ("pre-frac") DAS VSP survey time-lapse data ("time-lapse data") to establish a baseline reference for the direct acoustic wave travel time. The DAS VSP technique then obtains one or more time-lapse data corresponding to the subsequent monitor surveys conducted after each hydraulic fracturing stage along the well. Forward modeling is then used to determine a theoretical acoustic wave travel time difference (the amount of time slowed by the induced fracture zone). The forward modeling uses seismic anisotropy to describe the behavior of seismic waves traveling through the induced fracture regions. An inversion scheme is then used to invert for the induced fracture height and the fracture density using the forward modeling. The two extracted induced fracture characteristics may then be used to determine optimal hydraulic fracturing parameters.

Example DAS VSP System

FIG. 1 depicts an example DAS VSP system for determining induced fracture height and fracture density. In FIG. 1, a DAS VSP system includes a seismic source 115. The seismic source 115 outputs acoustic energy at or near a surface 111 of a subterranean formation 102 which produces seismic waves 154 in the subterranean formation 102. The seismic source 115 may include one or more of explosives (e.g., dynamite), air guns, thumper trucks, a seismic vibrator (e.g., vibroseis), and other technologies which inject acoustic energy into the subterranean formation 102. The DAS VSP system includes an optical fiber 113 in the subterranean formation 102 that performs distributed acoustic sensing of the seismic waves 154. The DAS VSP system includes a light source 116, a detector 117, and a distributed acoustic sensor in the form of an optical fiber 113. The light source 116 and detector 117 may be located at or near a surface 111 of the subterranean formation 102. One or more optical fibers are disposed inside the wellbore 103, although only a single optical fiber 113 is illustrated in FIG. 1. The optical fibers may be positioned downhole in the wellbore 103 in various ways as described in FIGS. 2-4. The optical fiber 113 may be a multimode and/or single mode optical fiber or may be engineered fiber which increases the amount of backscattered light over that from conventional optical fiber. In some examples, the optical fiber 113 is configured to be protected from corrosive wellbore fluids and elevated temperatures and pressures while providing direct mechanical coupling for distributed acoustic sensing of the seismic waves 154.

The optical fiber 113 detects the seismic waves 154 by pulsing laser light from the light source 116 down the optical fiber 113 and receiving by the detector 117 backscattered light indicative of strain at various locations along the optical fiber 113 resulting from the seismic waves 154 incident on the optical fiber 113. The backscattered light is analyzed by the DAS VSP system to generate seismic data indicative of sections or "channels" where the seismic waves 154 impinged the optical fiber 113. For example, the seismic data is identified by detecting or otherwise determining phase changes in the backscattered light, referred to alternately as a backscatter response, along the channels of the optical fiber 113.

The seismic waves 154 and the optical fiber 113 are used to obtain seismic data for each of induced fracture regions 142, 144, 146. The induced fracture regions 142, 144, 146 are regions in the subterranean formation 102 that have gone through hydraulic fracturing or other similar well stimulation operation. Hydraulic fracturing is a technique that involves forcing open cracks in subterranean formation through high-pressure injection of a fracturing fluid down the wellbore or casing to a target region of the subterranean formation. The region where the pressure can be increased is targeted by determining the sections of the casing that are perforated to allow the fracturing fluid to exit the casing. The increased pressure in the regions around the perforated casing causes cracks in the formation around the targeted region. Multiple regions of the subterranean formation 102 around a casing 107 may be fractured using a plug-and-perf technique that incorporates hydraulic fracturing. In the plug-and-perf technique a packer plug and a perforation gun are first pumped down the casing 107 to the edge of a desired section. Once the packer plug is set, the perforation gun fires and punches holes in a section, for example the first well section 148. Fracturing fluids are then pumped down and hydraulic fracturing takes place in the perforated first well section 148 and creates a corresponding first induced fracture region 142. This process may be repeated for multiple well sections 150, 152 to create corresponding induced fracture regions 144, 146. Each set of placing the packer plug, perforating the casing at a certain section, and performing hydraulic fracturing is considered one "stage" of the plug-and-perf technique. The seismic source 115 generates seismic waves 154 before and after each plug-and-perf stage. The seismic waves 154 would appear slower for channels corresponding to the induced fracture regions 142, 144, 146 due to the seismic anisotropy as explained above. The detector 117 sends DAS VSP data 120 obtained by the optical fiber 113 to a computer 122.

The computer 122 is programmed with a program 124 ("DAS VSP evaluator") that uses the DAS VSP data 120 to determine the induced fracture height and fracture density. The DAS VSP evaluator 124 includes a first program code 125 ("theoretical acoustic wave travel time difference calculation") to calculate the difference in the time that is expected for the seismic waves traveling through each induced fracture regions 142, 144, 146. The first program code 125 includes calculations based on characterization of seismic anisotropy of each induced fracture regions 142, 144, 146 based on the relationship between the respective incident angles 136, 138, 140 and their corresponding refraction angles 137, 139, 141 that are related to their induced fracture height and fracture density. The DAS VSP evaluator 124 includes a second program code ("inversion scheme") to determine induced fracture height and fracture density using an inversion scheme based on this time difference. The DAS VSP evaluator 124 then generates induced fracture height and fracture density data 128. Based on the data 128, the DAS VSP evaluator may obtain optimal hydraulic fracturing parameters 129 such as treatment volume, pad volume, injection rate, fracture fluid viscosity, fracture fluid density, fluid-loss additives, propping agent type, propping agent volume, etc. By setting the hydraulic fracturing parameters of a well stimulation operation based on the optimal parameters, the well stimulation operation may be optimized. Optimal parameters may be determined by cross plotting the production results of the well after a stimulation operation with the listed hydraulic fracturing parameters or by correlating the various hydraulic fracturing parameters with the production results. In some instances, determining the optimal hydraulic fracturing parameter process may involve changing the hydraulic fracturing parameters for multiple well sections, wherein each successive change is informed by the production results of the previous section.

Figure 2:
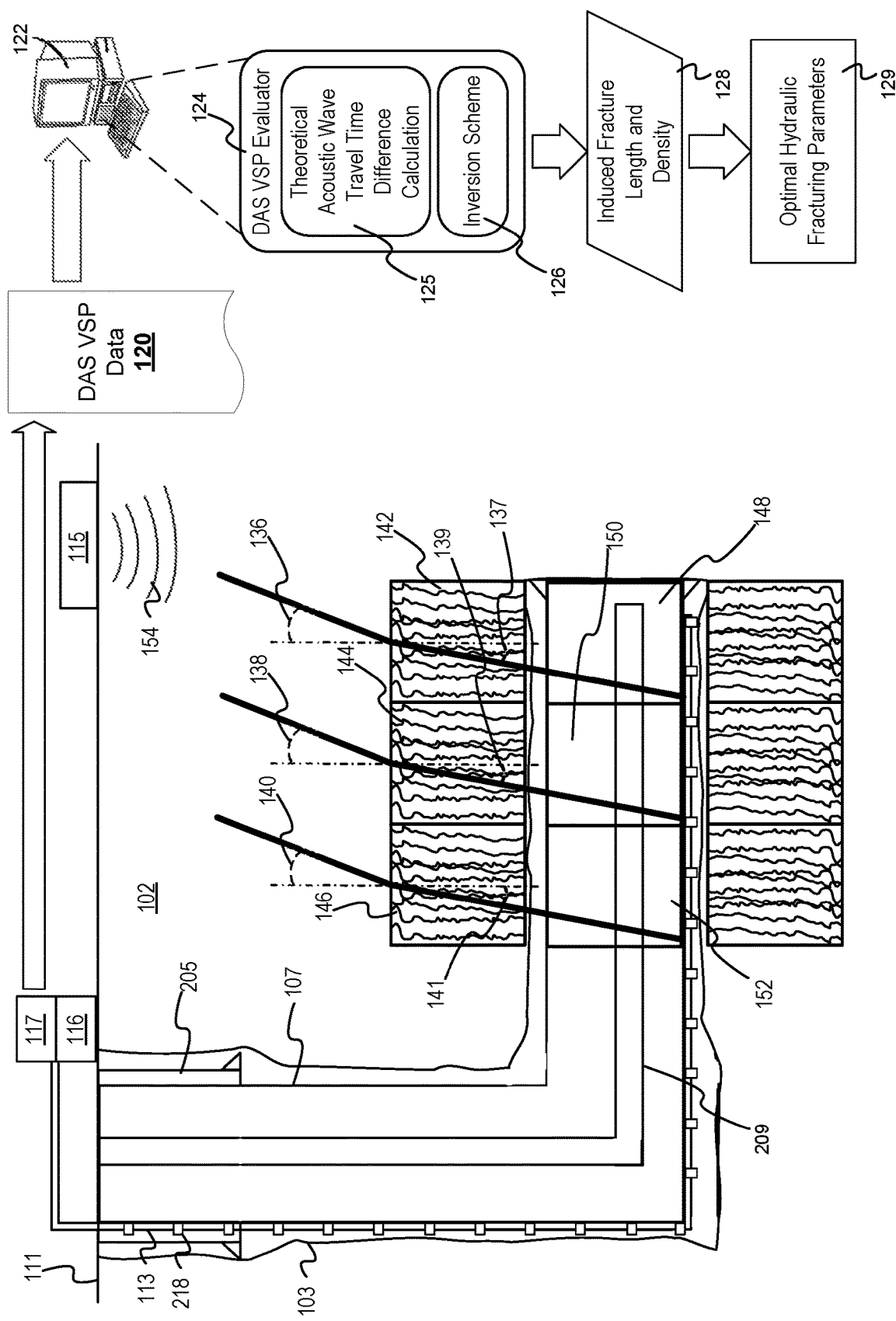
FIG. 2 depicts an example DAS VSP system that includes an optical fiber fixed to the outside of a casing of a cased wellbore for determining induced fracture height and fracture density.
Figure 3:
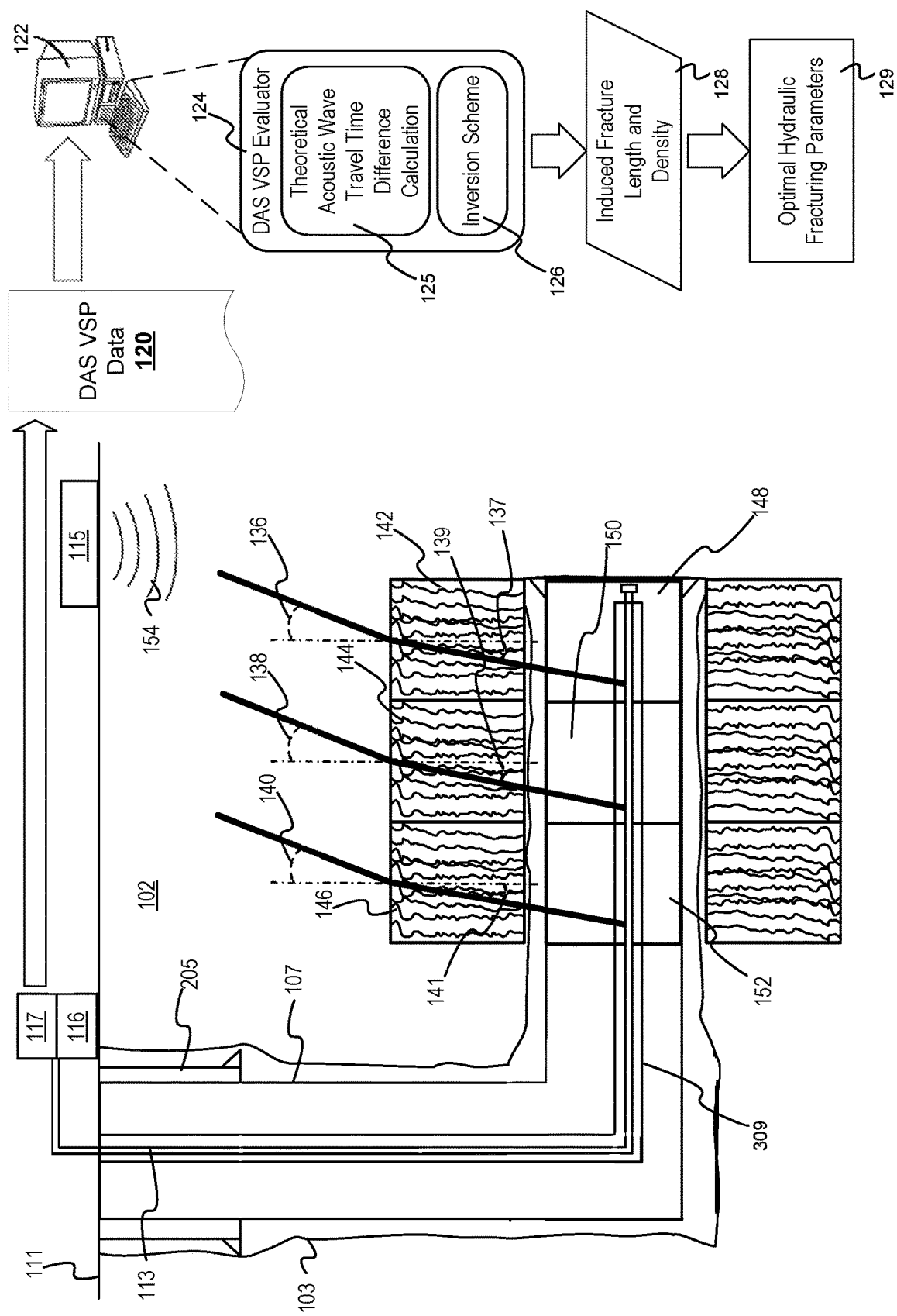
FIG. 3 depicts an example DAS VSP system that includes a conveyance and an optical fiber for determining induced fracture height and fracture density.
Figure 4:
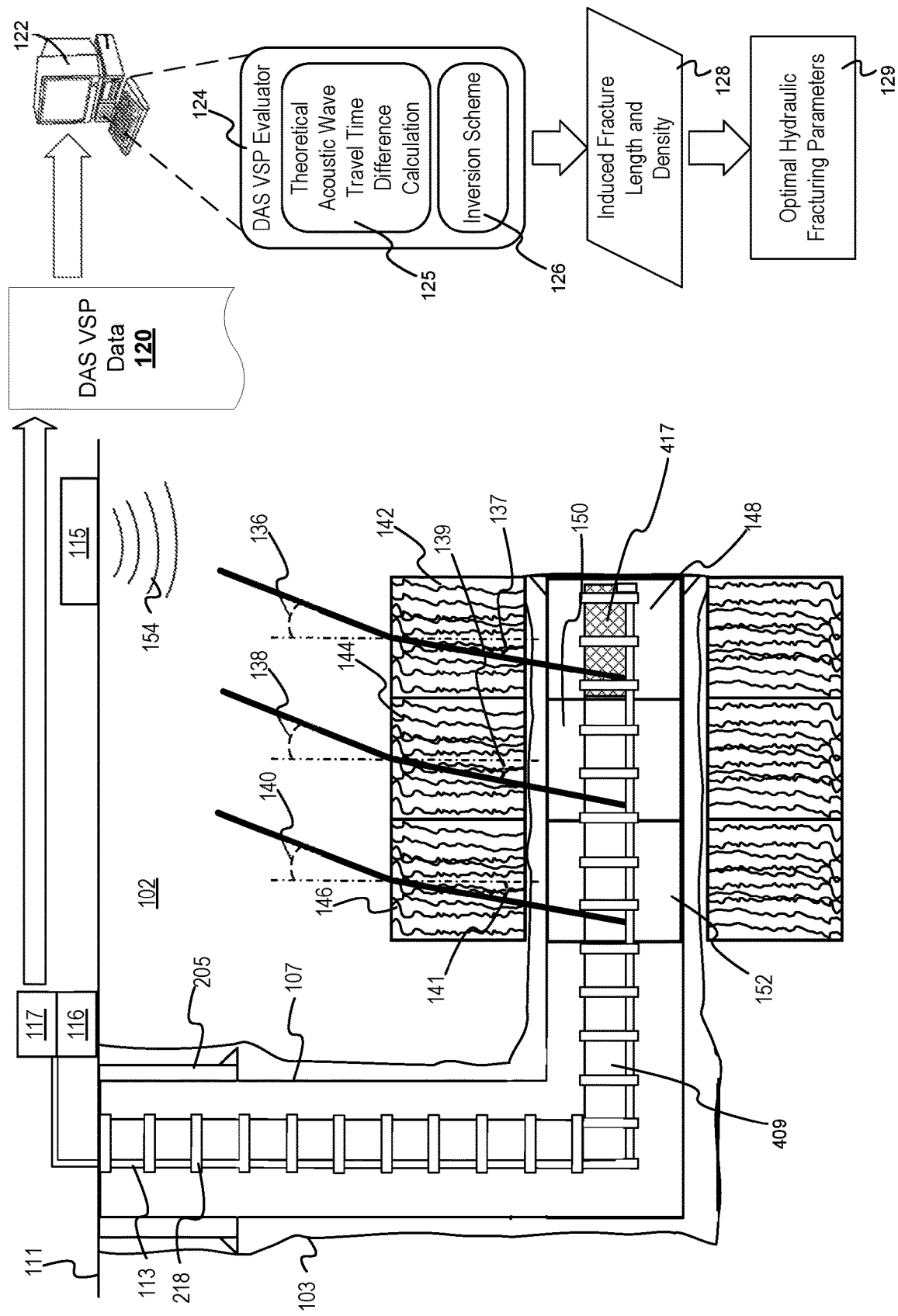
FIG. 4 depicts an example DAS VSP system that includes an optical fiber that is fixed to the outside of a tubing for determining induced fracture height and fracture density.

FIGS. 2-4 illustrate further variations of the DAS VSP system shown in FIG. 1. In the variations, similar components are referenced by similar reference numbers. For example, reference number 113 which refers to an optical fiber in FIG. 1 is similarly referred to as 113 in FIGS. 2-4 respectively. The use of similar reference numbers is provided for ease of understanding. Similar reference numbers do not imply that the similarly referenced components have similar structure.

FIG. 2 depicts an example DAS VSP system that includes an optical fiber fixed to the outside of a casing of a cased wellbore for determining induced fracture height and fracture density. The DAS VSP system can detect seismic waves 154 generated by a seismic source 115 at/near the surface 111 of the subterranean formation. A wellbore 103 has been drilled in the subterranean formation 102. The wellbore 103 can be a completed well (i.e. a well ready for production or injection following a drilling process) having a surface casing 205, a production casing 107 inside the surface casing 205, and a tubing 209 inside the production casing 107. In some embodiments, the tubing 209 can be a casing string, production string, or a work string, etc. The DAS VSP system includes an optical fiber 113 that is fixed to the outer perimeter of the production casing 107. Cross-coupling protectors 218 or other fasteners can be used to fix the optical fiber 113 to the outer perimeter of the production casing 107.

The optical fiber 113 detects the seismic waves 154 by pulsing laser light from a light source 116 down the optical fiber 113 and receiving by a detector 117 backscattered light indicative of strain at various locations along the optical fiber 113 resulting from the seismic waves 154 incident on the optical fiber 113. The seismic waves 154 and the optical fiber 113 are used to obtain DAS VSP data 120 for each of induced fracture regions 142, 144, 146 generated by a plug-and-perf technique on well sections 148, 150, 152. The detector 117 sends the DAS VSP data 120 to a computer 122. The computer 122 is programmed with a program 124 ("DAS VSP evaluator") that uses the DAS VSP data 120 to determine the induced fracture height and fracture density by using a first program code 125 ("theoretical acoustic wave travel time difference calculation") and a second program code ("inversion scheme") analogous to that described in FIG. 1. The theoretical acoustic wave travel time difference calculation 125 is based on the relationship between incident angles 136, 138, 140 and their corresponding refraction angles 137, 139, 141 of induced fracture regions 142, 144, 146. The DAS VSP evaluator 124 to generates induced fracture height and fracture density data 128. Based on the data 128, the DAS VSP evaluator 124 may obtain optimal hydraulic fracturing parameters 129.

FIG. 3 depicts an example DAS VSP system that includes a conveyance and an optical fiber for determining induced fracture height and fracture density. The DAS VSP system can detect seismic waves 154 generated by a seismic source 115 at/near the surface 111 of the subterranean formation. A wellbore 103 has been drilled in the subterranean formation 102. The wellbore 103 can be a completed well (i.e. a well ready for production or injection following a drilling process) having a surface casing 205, a production casing 107 inside the surface casing 205, and a conveyance 309 inside the production casing 107. In some embodiments, the conveyance 309 can be a wireline, a slickline, armored wireline, coiled tubing, work string, threaded pipe, etc. Although not depicted, a hoist may be used to run the conveyance 309 into the wellbore 103 which is disposed on a recovery vehicle. The hoist may be used, for example, to raise and lower wireline conveyance 309 in the wellbore 103.

The optical fiber 113 detects the seismic waves 154 by pulsing laser light from a light source 116 down the optical fiber 113 and receiving by a detector 117 backscattered light indicative of strain at various locations along the optical fiber 113 resulting from the seismic waves 154 incident on the optical fiber 113. The seismic waves 154 and the optical fiber 113 are used to obtain DAS VSP data 120 for each of induced fracture regions 142, 144, 146 generated by a plug-and-perf technique on well sections 148, 150, 152. The detector 117 sends the DAS VSP data 120 to a computer 122. The computer 122 is programmed with a program 124 ("DAS VSP evaluator") that uses the DAS VSP data 120 to determine the induced fracture height and fracture density by using a first program code 125 ("theoretical acoustic wave travel time difference calculation") and a second program code ("inversion scheme") analogous to that described in FIG. 1. The theoretical acoustic wave travel time difference calculation 125 is based on the relationship between incident angles 136, 138, 140 and their corresponding refraction angles 137, 139, 141 of induced fracture regions 142, 144, 146. The DAS VSP evaluator 124 to generate induced fracture height and fracture density data 128. Based on the data 128, the DAS VSP evaluator 124 may obtain optimal hydraulic fracturing parameters 129.

FIG. 4 depicts an example DAS VSP system that includes an optical fiber that is fixed to the outside of a tubing for determining induced fracture height and fracture density. The DAS VSP system can detect seismic waves 154 generated by a seismic source 115 at/near the surface 111 of the subterranean formation. A wellbore 103 has been drilled in the subterranean formation 102. The wellbore 103 can be a completed well (i.e. a well ready for production or injection following a drilling process) having a surface casing 205, a production casing 107 inside the surface casing 205, and a tubing 409 inside the production casing 107. In some embodiments, the tubing 409 can be a casing string, production string, or a work string, etc. The DAS VSP system includes an optical fiber 113 that is fixed to the outer perimeter of the tubing 409. Cross-coupling protectors 218 or other fasteners can be used to fix the optical fiber 113 to the outer perimeter of the production casing 107 such that it functions as a permanently installed seismic sensor. Cross-coupling protectors 218 or other fasteners can be used to fix the optical fiber 113 to the outer perimeter of the tubing 409. In addition, a tubing tail 417 can also be fixed to the optical fiber 113 and extend below the bottom of the tubing 409.

The optical fiber 113 detects the seismic waves 154 by pulsing laser light from a light source 116 down the optical fiber 113 and receiving by a detector 117 backscattered light indicative of strain at various locations along the optical fiber 113 resulting from the seismic waves 154 incident on the optical fiber 113. The seismic waves 154 and the optical fiber 113 are used to obtain DAS VSP data 120 for each of induced fracture regions 142, 144, 146 generated by a plug-and-perf technique on well sections 148, 150, 152. The detector 117 sends the DAS VSP data 120 to a computer 122. The computer 122 is programmed with a program 124 ("DAS VSP evaluator") that uses the DAS VSP data 120 to determine the induced fracture height and fracture density by using a first program code 125 ("theoretical acoustic wave travel time difference calculation") and a second program code ("inversion scheme") analogous to that described in FIG. 1. The theoretical acoustic wave travel time difference calculation 125 is based on the relationship between incident angles 136, 138, 140 and their corresponding refraction angles 137, 139, 141 of induced fracture regions 142, 144, 146. The DAS VSP evaluator 124 to generates induced fracture height and fracture density data 128. Based on the data 128, the DAS VSP evaluator 124 may obtain optimal hydraulic fracturing parameters 129.

Modifications, additions, or omissions may be made to the system of FIGS. 1-4. For example, multiple seismic sources 115 may be used. Moreover, three well sections 148, 150, 152 are shown as an example, there may be greater or fewer number of well sections used in the process. In another example, one or more of the light source and/or detector associated with the DAS system may be located downhole in the wellbore 103 or in the subterranean formation 102 instead of above ground.

Example DAS VSP Technique

The following example operations for a DAS VSP technique can be performed by hardware, software, firmware, or a combination thereof. For example, at least some of the operations can be performed by a processor executing program code or instructions. In some embodiments, such operations can be performed in a computer at the surface. The description refers to a "DAS VSP evaluator" as performing the example operations. The moniker "DAS VSP evaluator" is used for convenience as the operations are performed by a program or programs executed/interpreted by a device.

Figure 5:
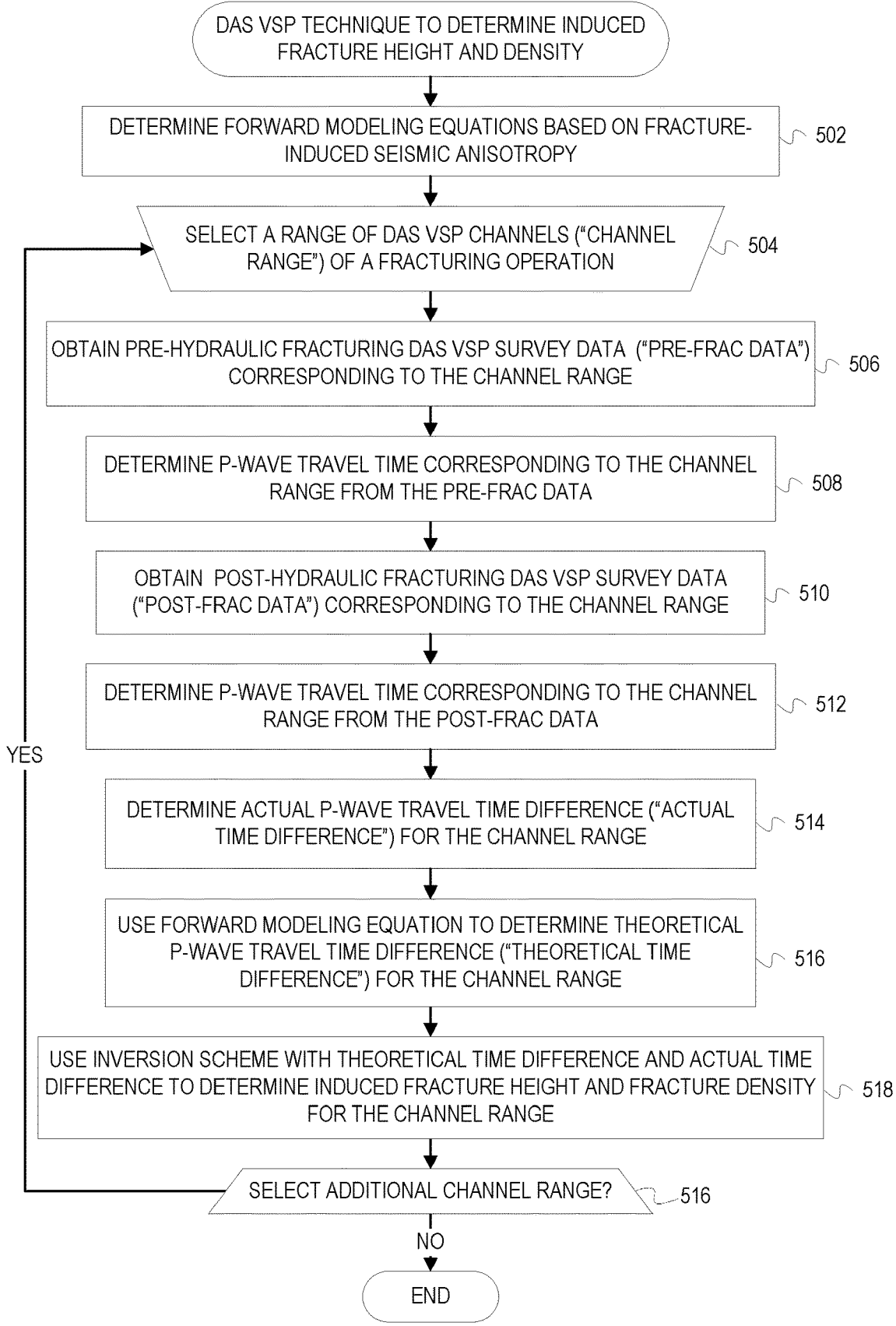
FIG. 5 depicts a flowchart of example operations for performing DAS VSP technique to determine induced fracture height and fracture density.

FIG. 5 depicts a flowchart of example operations for performing DAS VSP technique to determine induced fracture height and fracture density. At block 502, the DAS VSP evaluator determines forward modeling equations based on the fracture-induced seismic anisotropy. The DAS VSP evaluator identifies forward modeling equations of the fracturing-induced P-wave, indicated below as Equations (1) through (5). The travel time difference is calculated by characterizing the behavior of the P-wave traveling through the induced fracture regions of the subterranean formation as HTI zones. Although other combinations of forward modeling equations may be used to model the subterranean formation from which to determine the induced fracture height and fracture density, the flowchart describes a simplified model of the subterranean formation having a homogeneous pre-frac background and fracturing-induced HTI zones. The simplification of the subterranean formation as homogeneous pre-frac background and fracturing-induced HTI zones removes the additional burden of obtaining various formation properties to model the subterranean formation. The DAS VSP evaluator identifies Equation (1) for determining incident angle $\alpha_i$ and refraction angle $\alpha_r$ in the HTI zone. The incident and refraction angles at the HTI zone boundary are governed by Snell's law, shown in Equation (1) below.

$$\frac{\sin \alpha_i}{\sin \alpha_r} = \frac{v_{pb}}{v_p(\alpha_r)} \quad (1)$$

In Equation (1), $v_{pb}$ is the P-velocity of the background subterranean region and $v_p(\alpha_r)$ is the P-velocity of the HTI zone as a function of the refraction angle $\alpha_r$ in the HTI rock.

The DAS VSP evaluator identifies Equation (2), the formula for computing the TI medium assuming weak anisotropy in the HTI zone.

$$v_p(\alpha_r) = v_{pb}(1+\varepsilon \sin^4\alpha_r + \delta \sin^2\alpha_r \cos^2\alpha_r) \quad (2)$$

In Equation (2) $\varepsilon$ and $\delta$ are Thomsen anisotropy parameters for the TI medium. Equation (2) is originally derived for a VTI medium, where the $\alpha_r$ angle is measured from the (vertical) TI symmetry axis and $v_{pb}$ is the P-velocity along the vertical axis. DAS VSP evaluator may use the same equation for modeling the HTI medium by referring $\alpha_r$ and $v_{pb}$ to the vertical axis, instead of the (horizontal) HTI symmetry axis.

The DAS VSP evaluator identifies Equation (3), relating the Thomsen parameters to the fracture density e with the hydraulic fractures presumed to be thin, penny-shaped cracks.

$$\varepsilon = \begin{cases} 0 & \text{(fluid filled)} \\ -\frac{8}{3}e & \text{(gas filled)} \end{cases} \quad (3)$$

$$\delta = \begin{cases} -\frac{32ge}{3(3-2g)} & \text{(fluid filled)} \\ -\frac{8}{3}e\left[1+\frac{g(1-2g)}{(3-2g)(1-g)}\right] & \text{(gas filled)} \end{cases}$$

In Equation (3), $$g = \left(\frac{v_{sb}}{v_{pb}}\right)^2$$

is the square of the S-to-P velocity ratio of the background subterranean region and e is the fracture density. The relation between anisotropy and fracture density varies depending on whether the fracture is filled with fluid or gas.

The DAS VSP evaluator identifies Equation (4), relating fracture height h in the forward modeling equation with incident angle and refraction angle. For the HTI anisotropic zone around the fracking stage, the zone thickness is taken as the vertical extension of the fracture from the well to the zone boundary, i.e., the fracture height. This is characterized by Equation (4).

$$(H-h)\tan \alpha_i + h \tan \alpha_r = H \tan \alpha_0 \quad (4)$$

In Equation (4), H is the vertical distance from the source to the well and $\alpha_0$ is a pre-frac P-wave incident angle from the source to the fiber receiver.

The DAS VSP evaluator identifies Equation (5) that combines Equations (1) through (4) to calculate the theoretical travel-time difference of the P-wave through the induced fracture region.

$$T_{diff} = \frac{H-h}{v_{pb}\cos\alpha_i} + \frac{h}{v_p(\alpha_r)\cos\alpha_r} - \frac{H}{v_{pb}\cos\alpha_0} \quad (5)$$

At block 504, the DAS VSP evaluator selects a range of DAS VSP channels ("channel range") of a fracturing operation. For instance, the DAS VSP evaluator selects a channel range based on a packer plug depth and a hydraulic fracturing region around each section corresponding to a single stage of the plug-and-perf technique. The DAS VSP evaluator is not limited to a certain interval or sections (DAS VSP may select half of the section of one stage and half of the section of the next stage). However, because the time delays that will ultimately be observed following each stage are between the packer plug depth and the actual induced fracture region, the region corresponding to each stage is commonly selected. In some embodiments, the selection of the channel range may include multiple stages of the plug-and-perf technique. In another embodiment, different weights may be placed for different channels to form the channel range.

At block 506, the DAS VSP evaluator obtains pre-hydraulic fracturing DAS VSP survey data ("pre-frac data") corresponding to the selected channel range. Pre-frac data are the DAS VSP data measured before the hydraulic fracturing has taken place. Before the start of each stage of the plug-and-perf technique, a seismic source generates seismic waves as described in the example DAS VSP system above. As the seismic waves impinge the optical fiber, they create strain at various locations along an optical fiber that are pulsing with light. The strain in the optical fiber in turn generates backscattered light that may be measured as seismic data. Although data along the entire optical fiber is obtained during the DAS VSP survey, the DAS VSP data corresponding to the channel range is identified as the pre-frac data.

At block 508, the DAS VSP evaluator determines a P-wave travel time corresponding to the channel range from the pre-frac data. P-waves travel as compressional waves in the subsurface. P-waves are faster than other seismic wave forms (such as S-waves which travel as transverse waves) and therefore arrive at the optical fiber earlier than other waves. The DAS VSP evaluator analyzes the DAS VSP data measured at block 506 and determines the velocity of the P-waves by using the arrival times of the first seismic wave along the channel range.

At block 510, the DAS VSP evaluator obtains a post-hydraulic fracturing monitor survey DAS VSP time-lapse data ("post-frac data") corresponding to the channel range. The post-frac data are the DAS VSP data measured after the hydraulic fracturing has taken place. After the completion of each stage of the plug-and-perf technique, a DAS VSP survey as described at block 506 is performed. Unlike the DAS VSP survey at block 506, the post-frac data contains time-lapse data wherein multiple DAS VSP survey are performed in rapid succession. In one embodiment, the seismic waves are generated every 10 minutes to perform successive DAS VSP surveys.

At block 512, the DAS VSP evaluator determines a P-wave travel time corresponding to the channel range from the post-frac data. As described at block 508, the P-waves travel as compressional waves in the subsurface and are faster than other seismic wave forms. The DAS VSP evaluator analyzes the DAS VSP data measured at block 510 and determines the velocity of the P-waves by using the arrival times of the first seismic wave along the channel range.

At block 514, the DAS VSP evaluator determines actual P-wave travel time difference. The DAS VSP evaluator determines the difference between the P-wave travel time corresponding to the post-frac data obtained at block 510 and the P-wave travel time corresponding to the pre-frac data obtained at block 506.

At block 516, the DAS VSP evaluator uses forward modeling equations obtained at block 502 to determine theoretical P-wave travel time difference, $T_{diff}$, for the channel range. The DAS VSP evaluator solves Equations (1) through (4) to find the angle parameters for the P-wave travel path for the background model with known P- and S-velocity values and HTI zone with fluid-filled hydraulic fractures. Using the solutions of Equations (1) through (4), the DAS VSP evaluator solves for the $T_{diff}$ with respect to the fracture height and fracture density for the channel range.

At block 518, the DAS VSP evaluator uses an inversion scheme with the theoretical time difference and the actual time difference to determine induced fracture height and fracture density for the channel range. The theoretical time difference determined at block 516 is compared with the measured actual time difference for each fiber receiver channel along the well determined at block 514. The DAS VSP evaluator first obtains the RMS difference between the two data (theoretical time difference and measured time difference) to construct a cost function with the fracture height and fracture intensity as variable parameters. This cost function is shown in Equation (6).

$$\text{CostFun}(h,e) = \Sigma_i w_i [T_{diff}(h,e) - T_{lapse}]_i^2 \qquad (6)$$

In Equation (6) the index i refers to the i-th channel in the survey line. The sum may be over one or more surveyed channel range in the survey. The symbol w is a weight parameter for the receiver data, which is used to condition the data for the inversion. By using median filtering to suppress noise in the measured time difference, $T_{lapse}$, the filtered data, after proper normalization, are used to weight each term in equation (6). The data points in the vicinity of the stage are given more importance than the data points away from the stage. The DAS VSP evaluator adjusts the fracture parameters h and e to minimize the function and thereby determine the induced fracture height and fracture density for the channel range.

At block 518, the DAS VSP evaluator determines whether there is an additional channel range to determine the induced fracture height and fracture density for. In some embodiments, the DAS VSP evaluator repeats blocks 502, 504, 506, 508, 510, 512, 514, 516, and 518 to determine the induced fracture and density for all channels corresponding to all of the stages of the plug-and-frac technique.

In another embodiment, the DAS VSP evaluator determines forward modeling equations based on strong fracture-induced seismic anisotropy to determine the theoretical P-wave travel time difference, $T_{diff}$, for the channel range. The DAS VSP evaluator identifies Equation (1), Equation (3), and Equations (7) through (11) that describe the intensively fractured regions. The DAS VSP evaluator identifies Equations (1) and (3) as described at block 502 above.

The DAS VSP evaluator identifies Equation (7) for computing the phase velocity $v_p(\theta)$ in a TI medium.

$$v_p(\theta) = \frac{}{v_{pb}\sqrt{1 + \varepsilon \sin^2\theta - \frac{f}{2} + \frac{f}{2}\sqrt{\left(1 + \frac{2\varepsilon \sin^2\theta}{f}\right)^2 - \frac{8(\varepsilon - \delta)\sin^2\theta \cos^2\theta}{f}}}} \qquad (7)$$

In Equation (7), $\varepsilon$ and $\delta$ are Thomsen anisotropy parameters for the TI medium;

$$f = 1 - \left(\frac{v_{pb}}{v_{sb}}\right)^2,$$

and $v_{pb}$ and $v_{sb}$ are the P- and S-wave velocity of the background subterranean region.

The DAS VSP evaluator identifies Equation (8), the relationship between fracture height h and the incidence/refraction angles for regions having strong anisotropy.

$$(H-h)\tan\theta_i + h\tan\psi = H\tan\theta_0 \qquad (8)$$

In Equation (8), H is the vertical distance from the source to the well, $\theta_i$ and $\theta_0$ are the P-wave incident angle with and without the HTI zone. The angle $\psi$ is the ray angle related to the seismic energy propagation along the ray from the HTI zone boundary to the fiber receiver. The angle $\theta$, described in Equation (7), is equivalent to the refraction angle $\alpha_r$, described in Equation (1), which is called the phase angle.

The DAS VSP evaluator identifies Equation (9), the phase and group angles in the HTI medium.

$$\tan\psi(\theta) = \frac{\tan\theta + \frac{1}{v_p}\frac{dv_p(\theta)}{d\theta}}{1 - \tan\theta \frac{1}{v_p}\frac{dv_p(\theta)}{d\theta}} \qquad (9)$$

In Equation (9) both $\psi$ and $\theta$ are measured from the vertical axis, not the (horizontal) HTI asymmetry axis. The DAS VSP evaluator obtains the phase velocity derivative in Equation (9) directly from Equation (7).

The DAS VSP evaluator identifies Equation (10) that combines Equation (1), Equation (3), and Equations (7) through (9) to calculate the theoretical travel-time difference of the P-wave through the induced fracture region.

$$T_{diff} = \frac{H-h}{v_{pb}\cos\theta_i} + \frac{h}{v_g(\psi)\cos\psi} - \frac{H}{v_{pb}\cos\theta_0} \qquad (10)$$

The DAS VSP evaluator identifies Equation (11), the group velocity of the seismic energy propagation in the anisotropic HTI zone.

$$v_g(\psi(\theta)) = \sqrt{(v_p(\theta))^2 + \left(\frac{dv_p(\theta)}{d\theta}\right)^2} \qquad (11)$$

The DAS VSP evaluator uses forward modeling equations, Equations (1), (3), and (7) through (11) to determine theoretical P-wave travel time difference for the channel range. The DAS VSP evaluator solves Equations (1), (3), and (7) through (9) to find the angle parameters for the P-wave travel path. Using the solutions of Equations (1), (3), and (7) through (9), the DAS VSP evaluator solves for the $T_{diff}$, described in Equations (10) and (11), with respect to the fracture height and fracture density for the channel range.

Figure 6:
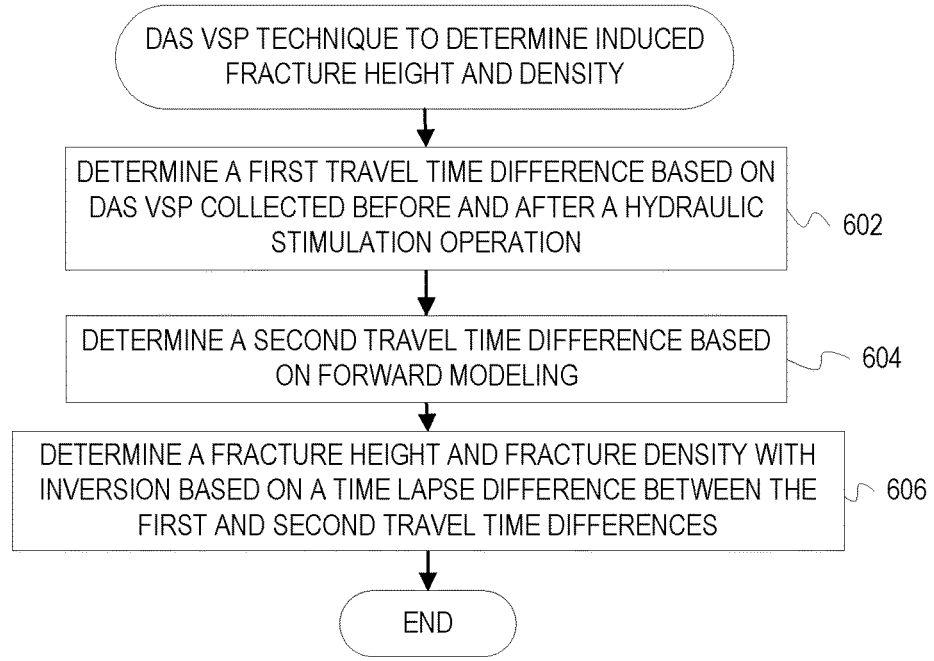
FIG. 6 depicts another flowchart of example operations for performing DAS VSP technique the induced fracture height and fracture density.

FIG. 6 depicts another flowchart of example operations for performing DAS VSP technique based determination of the induced fracture height and fracture density. At block 602, the DAS VSP evaluator determines a first travel time difference based on DAS VSP data collected before and after a hydraulic stimulation operation. The DAS VSP evaluator compares the travel times of the seismic waves of pre-frac data and post-frac data of the induced fracture region to determine the first travel time difference.

At block 604, the DAS VSP evaluator determines a second travel time difference of seismic waves in an induced fracture region based on forward modeling. The DAS VSP evaluator determines a second travel time difference by determining the forward equations for seismic waves in an induced fracture region and solving the angle parameters for the seismic wave travel path.

At block 606, the DAS VSP evaluator determines a fracture height and fracture density with inversion based on a time lapse difference between the first and second travel time differences. The DAS VSP evaluator performs an inversion technique using the forward model and first travel time difference obtained at block 602 and the second travel time difference obtained at block 604 to determine the fracture height and fracture density of the induced fracture region.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 206 and 208 can be performed in parallel or concurrently. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain or store a program for use by or in connection with an instruction execution system, apparatus, or device. A machine readable storage medium is not a machine readable signal medium.

Example DAS VSP Computer

Figure 7:
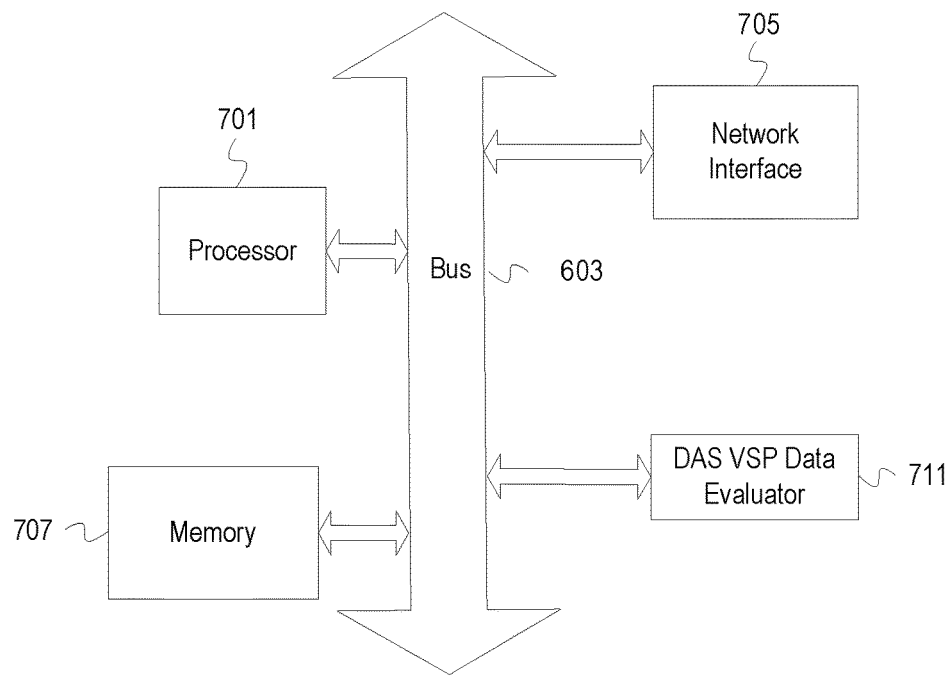
FIG. 7 depicts an example computer system with a DAS VSP evaluator.

FIG. 7 depicts an example computer system with a DAS VSP evaluator. The computer system includes a processor 701 (possibly including multiple processors, multiple cores, multiple nodes, and/or implementing multi-threading, etc.). The computer system includes memory 707. The memory 707 may be system memory or any one or more of the above already described possible realizations of machine-readable media. The computer system also includes a bus and a network interface 705. The system also includes a DAS VSP evaluator 711. The DAS VSP evaluator 711 performs a DAS VSP technique described above, including theoretical acoustic wave travel time difference calculation and inversion scheme, to determine induced fracture height and fracture density for a range of channels. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

Use of the phrase "at least one of preceding a list with the conjunction" "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Example Embodiments

Embodiments include a method comprising determining a first travel time difference based on distributed acoustic sensing vertical seismic profile data collected before and after a well stimulation operation in a well with optical fiber, determining a second travel time difference based on forward modeling for the well, and determining a fracture height and fracture density with inversion based on a time lapse difference between the first and second travel time differences. The first and second travel time differences may be P-wave travel time differences. Embodiments of the method can also select a range of channels of the well for which the distributed acoustic sensing vertical seismic profile data has been collected. In this case, determining the first travel time difference and the second travel time difference is for each of the channels in the selected range, the time lapse difference is calculated for each of the channels, and determining a fracture height and fracture density comprises applying inversion based on the time lapse difference between first and second travel time differences of each of the channels over the range of channels. Determining the second travel time difference based on forward modeling for the well may comprise determining an angle of incident of a P-wave with the forward modeling. Determining the second travel time difference based on forward modeling for the well may comprise characterizing a subterranean formation around the well as consisting of a homogeneous background zone and a horizontal transversely isotropic medium. Determining the second travel time difference based on forward modeling for the well can comprise characterizing anisotropy of the well corresponding to the well stimulation operation. Characterizing the anisotropy of the well comprises characterizing strong fracture-induced seismic anisotropy of the well corresponding to the well stimulation operation. Embodiments including the method can also determine a hydraulic fracturing operation parameter based on at least one of the determined fracture height and determined fracture density. Embodiments including the method can further comprise setting the hydraulic fracturing operation parameter for a second well stimulation operation. The hydraulic fracturing operation parameter can comprise at least one of treatment fluid volume, pad fluid volume, injection rate, fracture fluid viscosity, fracture fluid density, fluid-loss additives, propping agent type, or propping agent volume.

Embodiments include a system comprising a processor and a machine-readable medium having instructions stored thereon that are executable by the processor to cause the system to determine a first travel time difference based on distributed acoustic sensing vertical seismic profile data collected before and after a well stimulation operation in a well with optical fiber, determine a second travel time difference based on forward modeling for the well, and determine a fracture height and fracture density with inversion based on a time lapse difference between the first and second travel time differences. The machine-readable medium may further have stored thereon instructions executable to cause the system to select a range of channels of the well for which the distributed acoustic sensing vertical seismic profile data has been collected. The instructions to cause the system to determine the first travel time difference and the second travel time difference can comprise the instructions being executable by the processor to cause the system to determine the first and second travel time differences for each of the channels in the selected range. In this case, the time lapse difference is calculated for each of the channels, and the instructions to determine a fracture height and fracture density comprise instructions to apply inversion based on the time lapse difference between first and second travel time differences of each of the channels over the range of channels. The instructions to determine the second travel time difference based on forward modeling for the well may comprise instructions to determine an angle of incident of a P-wave with the forward modeling. The instructions to determine the second travel time difference based on forward modeling for the well may comprise instructions to characterize a subterranean formation around the well to consist of a homogeneous background zone and a horizontal transversely isotropic medium. The instructions to determine the second travel time difference based on forward modeling for the well may comprise instructions to characterize anisotropy of the well corresponding to the well stimulation operation. Embodiments including the system may also include the machine-readable medium further having stored thereon instructions to determine a hydraulic fracturing operation parameter based on at least one of the determined fracture height and determined fracture density.

Embodiments include a machine-readable medium having instructions stored thereon that are executable by a computing device to perform operations comprising determining a first travel time difference based on distributed acoustic sensing vertical seismic profile data collected before and after a well stimulation operation in a well with optical fiber, determining a second travel time difference based on forward modeling for a well, and determining a fracture height and fracture density with inversion based on a time lapse difference between the first and second travel time differences. The computer-readable medium can further comprise instructions executable by a computing device to perform operations comprising selecting a range of channels of the well for which the distributed acoustic sensing vertical seismic profile data have been collected. In such embodiments, determining the first travel time difference and the second travel time difference is for each of the channels in the selected range, the time lapse difference is calculated for each of the channels, and determining a fracture height and fracture density comprises applying inversion based on the time lapse difference between first and second travel time differences of each of the channels over the range of channels. Determining the second travel time difference based on forward modeling for the well may comprise determining an angle of incident of a P-wave with the forward modeling. Determining the second travel time difference based on forward modeling for the well can comprise characterizing a subterranean formation around the well as consisting of a homogeneous background zone and a horizontal transversely isotropic medium.

What is claimed is:

1. A method comprising:
   determining a first travel time difference based on distributed acoustic sensing vertical seismic profile data collected before and after a well stimulation operation in a well with optical fiber;
   determining a second travel time difference based on forward modeling for the well; and
   determining a fracture height and fracture density with inversion based on a time lapse difference between the first and second travel time differences.

2. The method of claim 1, wherein the first and second travel time differences are P-wave travel time differences.

3. The method of claim 1 further comprising:
   selecting a range of channels of the well for which the distributed acoustic sensing vertical seismic profile data has been collected,
   wherein determining the first travel time difference and the second travel time difference is for each of the channels in the selected range;
   wherein the time lapse difference is calculated for each of the channels; and
   wherein determining the fracture height and fracture density comprises applying inversion based on the time lapse difference between first and second travel time differences of each of the channels over the range of channels.

4. The method of claim 1, wherein determining the second travel time difference based on forward modeling for the well comprises determining an angle of incident of a P-wave with the forward modeling.

5. The method of claim 1, wherein determining the second travel time difference based on forward modeling for the well comprises characterizing a subterranean formation around the well as consisting of a homogeneous background zone and a horizontal transversely isotropic medium.

6. The method of claim 1, wherein determining the second travel time difference based on forward modeling for the well comprises characterizing anisotropy of the well corresponding to the well stimulation operation.

7. The method of claim 6, wherein characterizing the anisotropy of the well comprises characterizing strong fracture-induced seismic anisotropy of the well corresponding to the well stimulation operation.

8. The method of claim 1 further comprising determining a hydraulic fracturing operation parameter based on at least one of the determined fracture height and determined fracture density.

9. The method of claim 8, further comprising setting the hydraulic fracturing operation parameter for a second well stimulation operation.

10. The method of claim 8, wherein the hydraulic fracturing operation parameter comprises at least one of treatment fluid volume, pad fluid volume, injection rate, fracture fluid viscosity, fracture fluid density, fluid-loss additives, propping agent type, or propping agent volume.

11. The method of claim 1 further comprising collecting the distributed acoustic sensing vertical seismic profile data according to a distributed acoustic sensing technique that at least uses the optical fiber.

12. A system comprising:
a processor; and
a machine-readable medium having instructions stored thereon that are executable by the processor to cause the system to,
determine a first travel time difference based on distributed acoustic sensing vertical seismic profile data collected before and after a well stimulation operation in a well with optical fiber,
determine a second travel time difference based on forward modeling for the well, and
determine a fracture height and fracture density with inversion based on a time lapse difference between the first and second travel time differences.

13. The system of claim 12 wherein the machine-readable medium further has stored thereon instructions causes the system to,
select a range of channels of the well for which the distributed acoustic sensing vertical seismic profile data has been collected,
wherein the instructions to cause the system to determine the first travel time difference and the second travel time difference comprises the instructions being executable by the processor to cause the system to determine the first and second travel time differences for each of the channels in the selected range,
wherein the time lapse difference is calculated for each of the channels,
wherein the instructions to determine the fracture height and fracture density comprise instructions executable by the processor to cause the system to apply inversion based on the time lapse difference between first and second travel time differences of each of the channels over the range of channels.

14. The system of claim 12, wherein the instructions to determine the second travel time difference based on forward modeling for the well comprises instruction to determine an angle of incident of a P-wave with the forward modeling.

15. The system of claim 12, wherein the instructions to determine the second travel time difference based on forward modeling for the well comprise instructions to characterize a subterranean formation around the well to consist of a homogeneous background zone and a horizontal transversely isotropic medium.

16. The system of claim 12, wherein instructions to determine the second travel time difference based on forward modeling for the well comprise instructions to characterize anisotropy of the well corresponding to the well stimulation operation.

17. The system of claim 12, wherein the machine-readable medium further has stored thereon instructions executable by the processor to cause the system to determine a hydraulic fracturing operation parameter based on at least one of the determined fracture height and determined fracture density.

18. The system of claim 12 further comprising:
the optical fiber disposed in the well;
a detector coupled to the optical fiber and operable to generate the distributed acoustic sensing vertical seismic profile data; and
a device coupled to receive the distributed acoustic sensing vertical seismic profile data from the detector, wherein the device comprises the processor and the machine-readable medium.

19. A machine-readable medium having instructions stored thereon that are executable by a computing device to perform operations comprising:
determining a first travel time difference based on distributed acoustic sensing vertical seismic profile data collected before and after a well stimulation operation in a well with optical fiber;
determining a second travel time difference based on forward modeling for a well; and
determining a fracture height and fracture density with inversion based on a time lapse difference between the first and second travel time differences.

20. The machine-readable medium of claim 19 further comprising instructions executable by the computing device to perform operations comprising:
selecting a range of channels of the well for which the distributed acoustic sensing vertical seismic profile data have been collected,
wherein determining the first travel time difference and the second travel time difference is for each of the channels in the selected range;
wherein the time lapse difference is calculated for each of the channels; and
wherein determining a fracture height and fracture density comprises applying inversion based on the time lapse difference between first and second travel time differences of each of the channels over the range of channels.

* * * * *